US008564981B2

(12) United States Patent
Harnefors et al.

(10) Patent No.: US 8,564,981 B2
(45) Date of Patent: Oct. 22, 2013

(54) MODULAR MULTI-LEVEL POWER CONVERTER WITH SECOND AND THIRD ORDER HARMONICS REDUCTION FILTER

(75) Inventors: Lennart Harnefors, Eskilstuna (SE); Staffan Norrga, Stockholm (SE); Anshuman Shukla, Västerås (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 13/641,380

(22) PCT Filed: Apr. 15, 2010

(86) PCT No.: PCT/EP2010/054997
§ 371 (c)(1),
(2), (4) Date: Oct. 15, 2012

(87) PCT Pub. No.: WO2011/127983
PCT Pub. Date: Oct. 20, 2011

(65) Prior Publication Data
US 2013/0027995 A1    Jan. 31, 2013

(51) Int. Cl.
*H02M 7/79*    (2006.01)
(52) U.S. Cl.
USPC ............................................. 363/40; 363/47
(58) Field of Classification Search
USPC ............ 363/44–48, 34–37, 39–41, 55, 56.01, 363/56.02, 63, 71, 75, 97, 98, 109, 363/131–134, 173, 163, 165
See application file for complete search history.

(56) References Cited

U.S. PATENT DOCUMENTS

| 5,003,455 | A | * | 3/1991 | Miller | 363/87 |
| 5,177,428 | A | * | 1/1993 | Hirose et al. | 323/207 |
| 5,210,685 | A | * | 5/1993 | Rosa | 363/109 |
| 5,872,707 | A | * | 2/1999 | Asplund | 363/51 |
| 6,519,169 | B1 | * | 2/2003 | Asplund et al. | 363/132 |

(Continued)

FOREIGN PATENT DOCUMENTS

| DE | 101 03 31 A1 | 7/2002 |
| GB | 2 397 445 A | 7/2004 |

(Continued)

OTHER PUBLICATIONS

Antonopoulus et al., "On Dynamics and Voltage Control of the Modular Multilevel Converter", IEEE 13th European Conference on Power Electronics and Applications, pp. 1-10, Sep. 8, 2009.

*Primary Examiner* — Adolf Berhane
*Assistant Examiner* — Nusrat Quddus
(74) *Attorney, Agent, or Firm* — Birch, Stewart, Kolasch & Birch, LLP (57) ABSTRACT

A device for converting a DC voltage into an AC voltage includes a passive electronic filter having a first and second energy storage element, a third energy storage element placed between the first and second energy storage elements, a fourth energy storage element connected between a junction of the first energy storage element and the third energy storage element and an AC terminal and a fifth energy storage element connected between a junction of the second energy storage element and the third energy storage element and the AC terminal. The energy storage elements are of two different types, capacitive and inductive, with values selected to provide reduction of frequency components at two times the fundamental frequency of the AC voltage and at three times the fundamental frequency of the AC voltage.

18 Claims, 6 Drawing Sheets

(56) References Cited

U.S. PATENT DOCUMENTS

| | | | |
|---|---|---|---|
| 7,485,987 B2* | 2/2009 | Mori et al. | 307/63 |
| 7,577,007 B2* | 8/2009 | Mori et al. | 363/71 |
| 8,400,796 B2* | 3/2013 | Dofnas et al. | 363/71 |
| 2005/0083716 A1* | 4/2005 | Marquardt | 363/132 |
| 2006/0227582 A1 | 10/2006 | Wei et al. | |
| 2007/0194627 A1* | 8/2007 | Mori et al. | 307/103 |
| 2008/0285314 A1* | 11/2008 | Kojori | 363/37 |
| 2011/0044082 A1* | 2/2011 | Norrga et al. | 363/127 |
| 2011/0261598 A1* | 10/2011 | Harnefors et al. | 363/40 |
| 2013/0070495 A1* | 3/2013 | Jonsson et al. | 363/84 |

FOREIGN PATENT DOCUMENTS

| | | |
|---|---|---|
| GB | 2459764 A | 11/2009 |
| WO | WO 95/04395 A1 | 2/1995 |
| WO | WO 2004/017505 A1 | 2/2004 |
| WO | WO 2008/067785 A1 | 6/2008 |
| WO | WO 2009/030275 A1 | 3/2009 |
| WO | WO 209/149755 A1 | 12/2009 |

* cited by examiner

MODULAR MULTI-LEVEL POWER CONVERTER WITH SECOND AND THIRD ORDER HARMONICS REDUCTION FILTER

FIELD OF THE INVENTION

The invention is related to a power converter with multi-level voltage output in the form of a device for converting a DC voltage into an AC voltage and vice versa comprising at least one phase leg with a first voltage source and a first passive energy storage element connected in series between a first DC terminal and a first AC terminal and with a second passive energy storage element and a second voltage source connected in series between the first AC terminal and a second DC terminal, where each of the voltage sources comprises at least a first and a second submodule in series-connection, each submodule comprising at least one power electronic switch connected in parallel with at least one capacitor.

BACKGROUND ART

In the art, multi-level converters are known to be used in order to reduce harmonic distortion in the output of voltage source converters. A multilevel converter is a converter where the output voltage—or, in case of a multiphase converter, the voltages—can assume several discrete levels, as can be seen for example in DE10103031.

In WO 2008/067785, a multi-level converter according to DE10103031 is disclosed which in addition comprises at least one inductor in each phase leg as well as regulating means to regulate a circulating current flowing through the phase legs, i.e., the current that closes between the phase legs but does not enter the AC grid through the AC terminal.

If the circulating-current is controlled, as described in WO 2008/067785, the voltage rating of the power electronic switches of the converter must allow for the extra voltage needed to regulate the circulating currents in the desired manner.

It is also known to add a zero sequence third harmonic to an AC voltage. This means that harmonics at three times the fundamental frequency are added to the converter AC voltage reference. Such an addition lowers the peak voltages of the converter and thereby the efficiency of the converter power is raised. However, these harmonics are normally not allowed in an AC grid and therefore they have to be removed. This removal is typically performed through using a transformer connected between the AC grid and the converter.

However, it is in some cases of interest to remove this transformer. This means that the zero sequence third harmonic has to be removed in some other way.

WO 2004/017505 describes one such alternative solution for removing these harmonics without the use of a transformer. This document describes the use of a phase conductor wound around an iron core and placed between a converter and the AC grid instead of a transformer. This phase conductor then takes care of the third harmonics removal.

It is however of interest to combine regulating of circulating currents with zero sequence third harmonic removal. This will limit the number of elements used for performing these two functions separately.

SUMMARY OF THE INVENTION

It is therefore an object of the invention to propose a power converter which allows for regulation of the circulating currents in a desired manner, where the required voltage rating of the power semiconductor switches is affected as little as possible at the same time as zero sequence third harmonic removal is performed using a limited number of converter elements.

This object is achieved by a device according to claim 1.

The device for converting a DC voltage into an AC voltage and vice versa as described above, comprises according to the invention a passive electronic filter which is arranged between the voltage source and the AC terminal. The passive electronic filter is adjusted to reduce harmonics in a circulating current as well as to remove zero-sequence third harmonics.

The invention is based on the recognition of the fact that the desired manner in which the circulating currents should best be regulated is to reduce the harmonics which occur at specific frequencies in the circulating current, rather than to reduce the circulating currents in general. This is according to the invention furthermore combined with zero-sequence third harmonics removal. What the inventors realized is that at each switching event in the power electronic switches of the converter, harmonics appear in the circulating current causing increased losses. As a worst case, some of the harmonics with distinctively high amplitude in the circulating currents could even lead to system instability. The introduction of additional inductors, as described in WO 2008/067785, helps to obtain a general current limitation in the converter circuit but does nothing to avoid the distinctive harmonics as such.

By introducing a passive electronic filter that reduces or in the best case completely blocks the harmonics with the highest amplitude, it is avoided that the control unit which controls the power semiconductor switches sees and takes into account the most disturbing components of the circulating currents. The requirements on the voltage rating of the power semiconductor switches can thereby be reduced.

A closer look at the harmonics in the circulating currents revealed the following: The sum of the voltage ripple over the submodules of both phase module branches in one phase leg shows in its frequency spectrum a main component at twice the fundamental frequency of the AC voltage. This main frequency component creates a parasitic harmonic component in the circulating current that is also of twice the fundamental frequency. Unless this component is somehow limited, increased losses will result; possibly even loss of system stability.

Therefore, according to a preferred embodiment of the invention, the parameters of the electronic filter are chosen so that harmonics at twice the fundamental frequency of the AC voltage are reduced, thereby specifically reducing the main disturbing component of the circulating current. This is furthermore combined with reducing harmonics at three times the fundamental frequency in order to remove zero sequence third harmonics without requiring a transformer.

BRIEF DESCRIPTION OF THE DRAWINGS

Other features and advantages of the present invention will become more apparent to a person skilled in the art from the following detailed description in conjunction with the appended drawings in which.

DETAILED DESCRIPTION OF THE INVENTION

Figure 1:
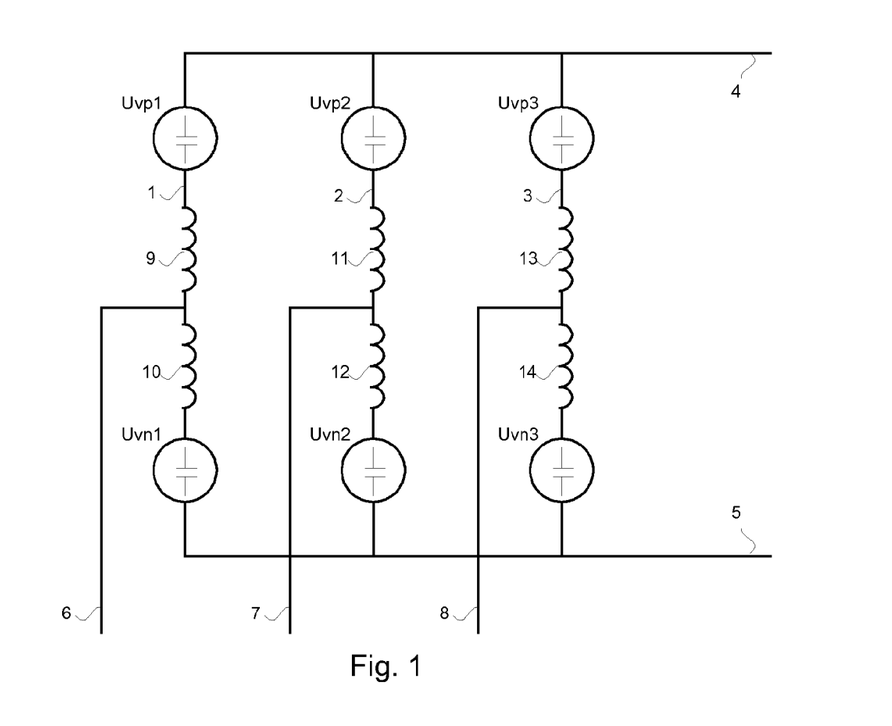
FIG. 1 shows a converter topology as is known from the art.

The device for converting a DC voltage into an AC voltage and vice versa according to the invention can contain either a single phase leg or multiple phase legs, depending on how many phases the AC voltage has. FIG. 1 shows a three-phase converter known in the art. The three phase legs 1, 2 and 3 of the device of FIG. 1 each comprise two so-called arms in series-connection: a positive, upper arm which is connected to a first DC terminal 4 at a positive voltage level, and a negative, lower arm, which is connected to a second DC terminal 5 at zero or a negative voltage level. Each positive arm comprises a series-connection of an upper voltage source Uvpi and a first passive energy storage element, here in the form of an inductor 9, 11 or 13, respectively, and each negative arm comprises a second passive energy storage element, here also in the form of an inductor 10, 12 or 14, respectively, and a lower voltage source Uvni, where i stands for the number of the corresponding phase leg. The midpoint or connection point between the first and second energy storage elements of each phase leg is each connected to an AC terminal 6, 7 or 8, respectively. All the phase legs are connected in parallel to each other and to the two DC terminals 4 and 5. By appropriately controlling the voltage sources of the phase legs over time, the AC to DC conversion is made.

Figure 2:
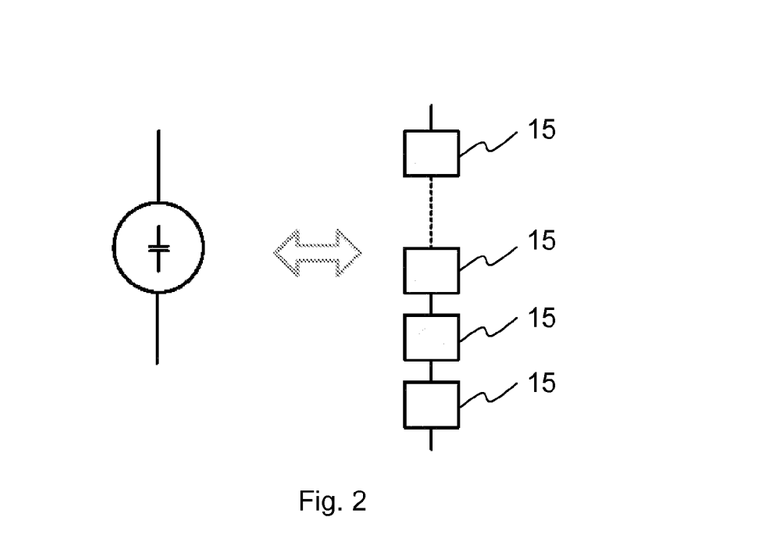
FIG. 2 shows the setup of the voltage sources in the phase legs of the converter of FIG. 1 as known from the art.

As is shown in FIG. 2, each voltage source is made up of a series connected string of submodules 15, where at least two submodules 15 are comprised in one such string.

Figure 3:
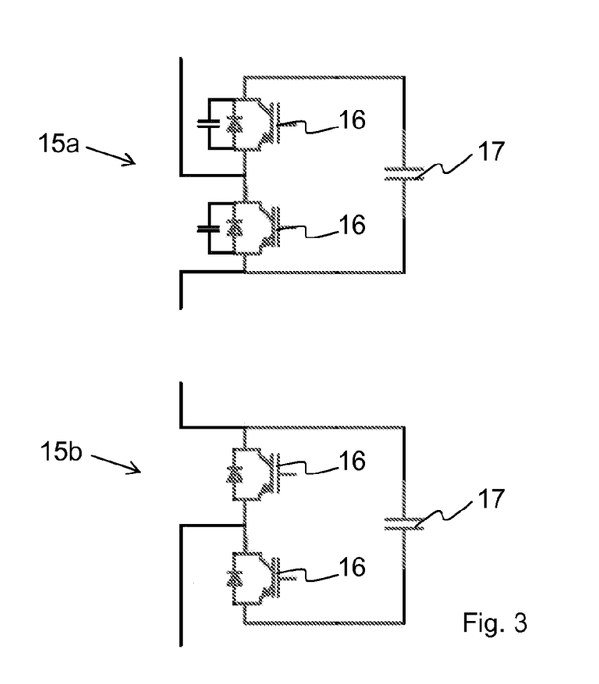
FIG. 3 shows two different embodiments of the submodules in the converter of FIGS. 1 and 2.

In FIG. 3, two different embodiments 15a and 15b of the submodules 15, which are known in the art, can be seen. Any combination of the submodules is possible within each voltage source. The submodules have the form of commutation cells, each cell comprising two valves and a large DC capacitor holding a direct voltage. The main valves are equipped with a power electronic switch 16 with turn-off capability and a free-wheeling diode in anti-parallel connection to the switch. Depending on which of the two power electronic switches 16 is conducting, the corresponding submodule can assume one of two switching states, where in state one zero voltage or in state two the capacitor voltage is applied to the output.

Figure 4:
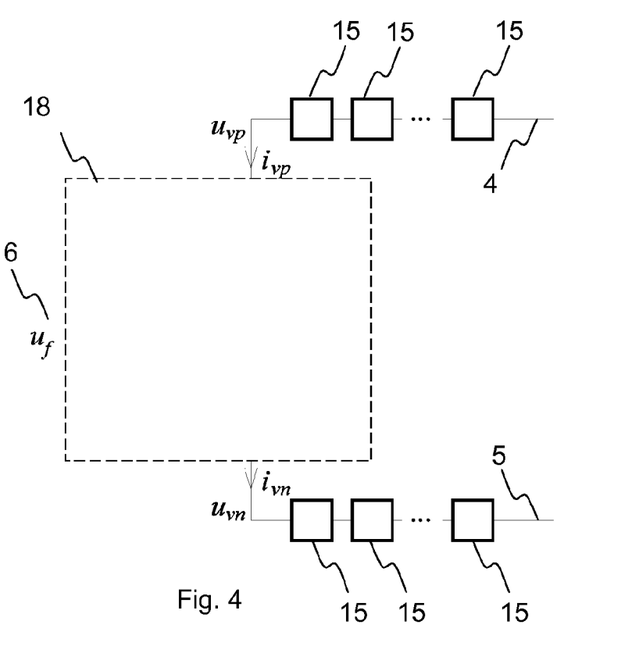
FIG. 4 shows one phase leg of a converter with a schematically shown electronic filter according to the invention.

According to the invention, the converter according to FIGS. 1 to 3 is additionally equipped with a passive electronic filter in each phase leg, as is depicted in FIG. 4 for phase leg 1. In FIG. 4, the filter 18 is shown as a dashed box. The filter includes three terminals a first terminal for being coupled to the first voltage source and first DC terminal 4, a second terminal for being coupled to the second voltage source and the second DC terminal 5 and finally a third terminal connected to the AC terminal 6 of the converter. As can be seen in FIG. 4 the first and second passive energy storage elements are being included in the passive filter.

Figure 5:
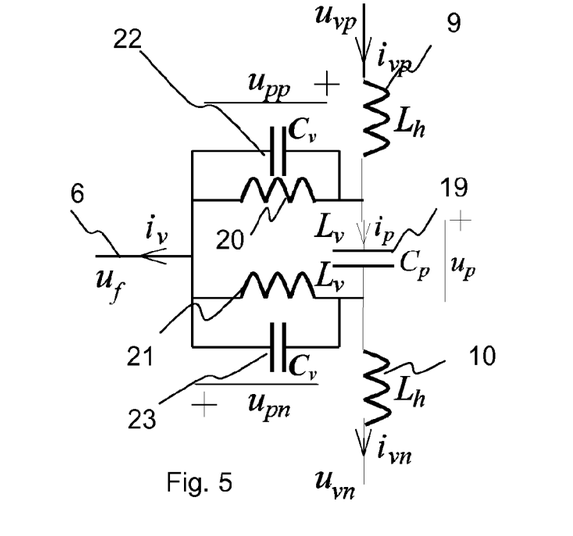
FIG. 5 shows an electronic filter according to a first embodiment of the invention.

A first embodiment of the filter 18 is shown FIG. 5. In between the first and second passive energy storage elements, 9 and 10, which are here both reactors having an inductance $L_h$, there is here provided a third passive energy storage element 19, in this first embodiment in the form of a capacitor having a capacitance of $C_p$. This third passive energy storage element 19 is thus provided in series with the first and second energy storage elements.

There is furthermore a fourth energy storage element 20, having two ends, a first end connected to a junction between the first energy storage element 9 and the third energy storage element 19 and a second end connected to the AC terminal 6. The fourth energy storage element 20 is here an inductor having an inductance $L_v$. There is furthermore a fifth energy storage element 21 having two ends a first end connected to a junction between the second energy storage element 10 and the third energy storage element 19 and a second end connected to the AC terminal 6. The fifth energy storage element 21 is in this embodiment also an inductor having an inductance $L_v$. As can be seen in FIG. 5, the filter includes two types of passive energy storage elements, inductive and capacitive energy storage elements. As is clear the third energy storage element 19 is of one of the types, here a capacitive energy storage element, while the fourth and fifth energy storage elements 20 and 21 are of another type, here inductive energy storage elements. In FIG. 5 there is furthermore a first further energy storage element 22 in parallel with the fourth energy storage element 20. This first further energy storage element is of another type than the fourth energy storage element and here capacitive with a capacitance $C_v$. There is also a second further energy storage element 23 in parallel with the fifth energy storage element 21. This second further energy storage element is of another type than the fifth energy storage element and here also capacitive with a capacitance $C_v$. Since the filter includes passive storage elements of the two types, it is clear that filtering is provided in relation to one or more frequencies. Another feature that can be readily observed is that there is a first path provided from the first DC terminal to the AC terminal via the first energy storage element 9 and the parallel connection of the fourth and first further energy storage elements 20 and 22 and a second path provided from the second DC terminal to the AC terminal via the second energy storage element 10 and the parallel connection of the fifth and second further energy storage elements 21 and 23. These paths are furthermore symmetrical, which means that the filter elements in them are provided of the same types in the same orders and with the same values in the first and the second paths. As indicated above each path includes a parallel connection of two types of passive energy storage elements.

As mentioned above the filter has filtering properties in relation to one or more frequencies. This filtering will now be described in more detail.

The symbols in FIG. 5 have the following meaning:

$u_{vp/n}$ voltage of the voltage source in positive or negative arm, respectively;

$i_{vp/n}$ current in positive/negative arm;

$i_v$ output current at AC terminal;

$u_f$ voltage at AC terminal (AC voltage);

$u_p$ voltage across the third energy storage element;

$i_p$ current through the third energy storage element;

$L_h$ inductance of the first and second energy storage element;

$C_p$ capacitance of the third energy storage element;

$L_v$ inductance of the fourth and fifth energy storage element;

$C_v$ capacitance of the first and second further energy storage element.

In the following it is described, how the parameters of the electronic filter are chosen in the depicted phase 1 in order to reduce the most disturbing harmonics of the circulating current, which occur at two times the fundamental frequency, together with a reduction of zero sequence third harmonics, which appear at three times the fundamental frequency.

When combining removal of harmonics at two and three times the fundamental frequency in this way it is of interests to study the common and differential modes of the converter voltages, where $$u_{vp} = u_v + u_{vc}$$

$$u_{vn} = u_v - u_{vc} \qquad (1)$$

where $u_{vp}$ is the voltage of the positive DC terminal, $u_{vn}$ is the voltage of the negative DC terminal, $u_v$ is the common mode component and $u_c$ is the differential mode component.

The harmonics at three times the fundamental frequency appears in the common-mode component $u_v$, while the harmonics at two times the fundamental frequency appears in the differential-mode component $u_{vc}$.

Due to symmetry, the common-mode component $u_v$ does not drive any current through the third energy storage element 19, because the potential on each side of this element 19 are affected equally by this component. This allows this element to be removed when the effect of the common-mode component is considered. The circuit in FIG. 5 is thus reduced to the two above mentioned paths in parallel and this can be simplified into the equivalent circuit diagram of the common-mode case shown in FIG. 6. There is here a parallel LC circuit where a capacitance $2C_v$ is connected in parallel with an inductance $L_h/2$, which parallel circuit is then connected in series with an inductance $L_v/2$. This circuit in FIG. 6 should be tuned to block the third harmonic component. This implies that $$\frac{1}{L_v C_v} = (3\omega_1)^2 \Rightarrow C_v = \frac{1}{9\omega_1^2 L_v} \qquad (2)$$

Figure 6:
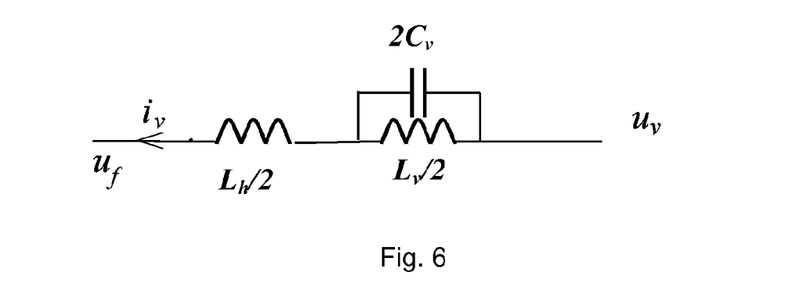
FIG. 6 shows an equivalent common mode realization of the filter according to the fourth embodiment.

The capacitance of the parallel connection is thus inversely proportional to the inductance of the parallel connection, where the inverse of the capacitance is equal to a fundamental frequency dependent constant times the inductance. It can also be seen that the constant is the square of the fundamental frequency times a factor that is a multiple of the number 3 and here a multiple of 3 of the number 3 and here also three raised by two.

Figure 7:
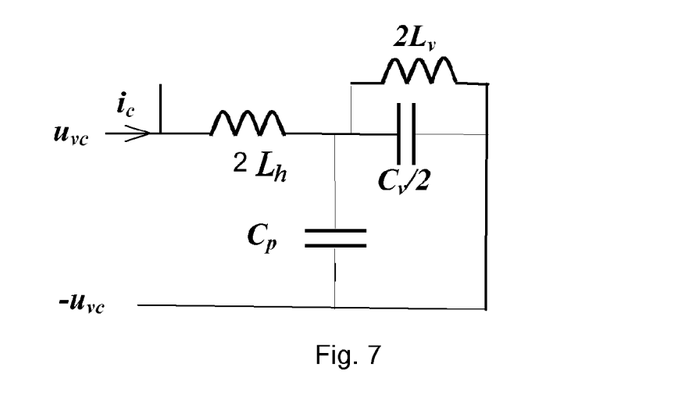
FIG. 7 shows an equivalent differential-mode realization of the filter according to the fourth embodiment

If then the differential-mode component $u_{vc}$ is considered, it can be seen that due to the symmetry, this component does not affect the voltage $u_f$ of the AC terminal and therefore not the grid current $i_v$, only the circulating current $i_c$. This means that the grid interface, i.e. the AC terminal 6, can be disconnected when the effect of the differential mode voltage $u_{vc}$ is studied. This implies that the two parallel connections made up of the third and first further energy storage elements 20 and 22 and the fourth and second further energy storage elements 21 and 23 are put in series as are the first and second energy storage elements 9 and 10. An equivalent circuit for the filter in this differential mode is shown in FIG. 7, where it can be seen that there is an inductance $2L_h$ connected between the positive differential mode voltage $u_{vc}$ and a junction. There is furthermore a parallel connection of a capacitance $C_v/2$, inductance $2L_v$ and capacitance $C_p$. These are all connected in parallel with each other between the same junction and the negative differential mode voltage $-u_{vc}$. In order to block the second harmonics component, the parallel connection should be set as $$\frac{1}{2L_v(C_v/2 + C_p)} = (2\omega_1)^2 \Rightarrow C_p + C_v/2 = \frac{1}{8\omega_1^2 L_v} \qquad (3)$$

With the use of equation (2) in equation (3) this can be simplified to $$C_p = \frac{5}{72\omega_1^2 L_v} \qquad (4)$$

It can be seen that the value of the third energy storage element is inversely proportional to the value of the fourth and fifth energy storage elements. The inverse of the value of the third energy storage element is furthermore equal to a fundamental frequency dependent constant times the value of the fourth and fifth energy storage elements, where this constant includes the square of the fundamental frequency times a factor that is a multiple of 2, which multiple is in this case 36. This factor is also a raising of the number two by eight. One observation that can be made in relation to equations (2) and (3) is that the third, fourth and fifth energy storage elements are involved in reducing components at twice the fundamental frequency, while the fourth, fifth, first further and second further energy storage elements are used for reducing components at three times the fundamental frequency.

Here it may also be of interest to compare equation (4) with the selection of $C_p$ if third-harmonic blocking is not performed in the filter. This situation corresponds to a setting of $C_v=0$. Therefore if $C_v$ is set to zero in equation 2, the value of $C_p$ is obtained according to $$C_p = \frac{1}{8\omega_1^2 L_p},$$

which is 80% larger than in equation (4).

In this way the first embodiment of the invention thus provides a filter, which blocks or reduces the frequencies at two and three times the fundamental frequency. Therefore this component at the two times the fundamental frequency is removed from the circulating currents, which thus reduces the circulating currents. The first embodiment of the invention furthermore also removes the component at three times the fundamental frequency, which therefore allows zero sequence third harmonics removal without using a transformer. These two types of harmonics component removal further uses some energy storage elements in relation to both components, where the fourth and fifth energy storage elements are here used in this dual way. Because of this dual functionality it is furthermore possible to reduce the size of the third energy storage element. This means that the filter is very economical.

When providing filtering of harmonics at three times the fundamental frequency there are some details that may need to be considered. The requirements for low injection of zero-sequence third-harmonic current into the grid may be strict, much more so than the requirements for suppression of the harmonic component at twice the fundamental frequency from the circulating current. Since there are always tolerances associated with the parameter values of the inductors and capacitors, as specified by the manufacturer in the case, it may be necessary to introduce an on-line tuning facility to some of the energy storage elements, for instance the ones involved in blocking second harmonics. It may also be necessary to tune the filter for tracking changes in grid frequency. It is here possible to provide an inductor with tap changers.

Take the filter in FIG. 5 as an example. Here it is possible to provide the fourth and fifth energy storage elements 20 and 21 with tap changers of a suitably selected number of steps and step sizes. As an alternative it is also possible to have the first and second further energy storage elements 22 and 23 variable, for instance through using capacitor banks, the capacitances of which can be modified in suitably selected steps through circuit breakers and/or switching semiconductors.

Figure 8:
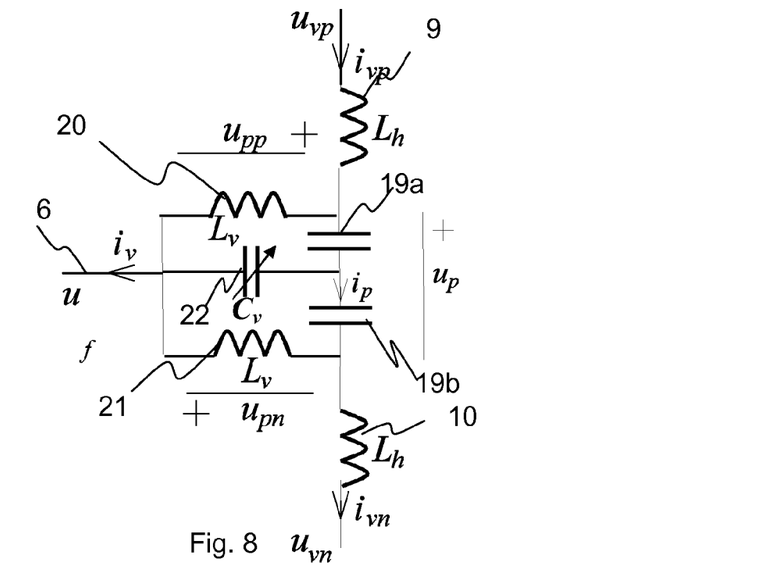
FIG. 8 shows an electronic filter according to a second embodiment of the invention.

When the energy storage elements are made adjustable in the way described above there will be provided two parallel variable elements, one in each path from a DC terminal to the AC terminal. It should here be realized that it may be advantageous to have only one such variable energy storage element in the filter, because then the provision of the same variation in relation to the two paths is easier to control. An example on this is shown in a second embodiment of the filter in FIG. 8, which is based on the first embodiment. The only elements that differ from the first embodiment are here the third energy storage element and the additional energy storage elements. Otherwise all elements are of the same type and provided in the same position as in the first embodiment. Here the third energy storage element has been split into two energy storage elements 19a and 19b of the same type, i.e. capacitive. The second further energy storage element has furthermore been deleted, while the first further energy storage element 22 is adjustable and at a first end connected to a midpoint of the third energy storage element and at a second opposite end connected to the AC terminal 6. Here the midpoint of the third energy storage element is provided as the junction between the two energy storage elements 19a and 19b resulting from the splitting. This filter functions in the same way as the filter according to the first embodiment, but the filter values can be adjusted and here through adjusting only one energy storage element. However, the selection of capacitor values $C_v$ and $C_p$ will differ from in the first embodiment.

As was mentioned above it may be of interest to use the converter without a transformer. Such a transformer is then not only used for removing zero sequence third harmonics. It also acts as a DC blocking element, i.e. it stops DC components appearing in a phase leg from reaching the AC grid. If no transformer is used these DC components will have to be removed or blocked in another way.

According to one variation of the invention the filter can, in addition to reducing harmonics at two and three times the fundamental frequency, also act as a DC blocking filter.

Figure 9:
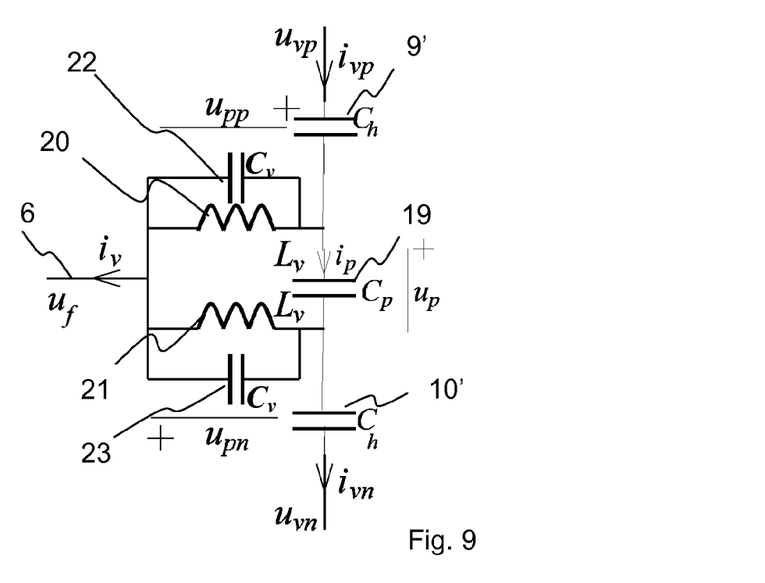
FIG. 9 shows an electronic filter according to a third embodiment of the invention.

A filter according to a third embodiment of the invention providing this triple functionality is shown in FIG. 9. FIG. 9 thus shows a filter according to a third embodiment of the invention having a first 9', second 10', third 19, fourth 20, fifth 21, first further 22 and second further 23 energy storage element in the same positions as the corresponding elements in the first embodiment. Here the third, fourth, fifth, first further and second further energy storage elements are the same elements of the same types at the same positions as in the first embodiment and shown in FIG. 5. However the first and second energy storage elements 9' and 10' are capacitive and not inductive. There are furthermore no inductive or restive elements in parallel with them. They will therefore stop any DC component appearing in the phase leg from reaching the AC terminal.

Figure 10:
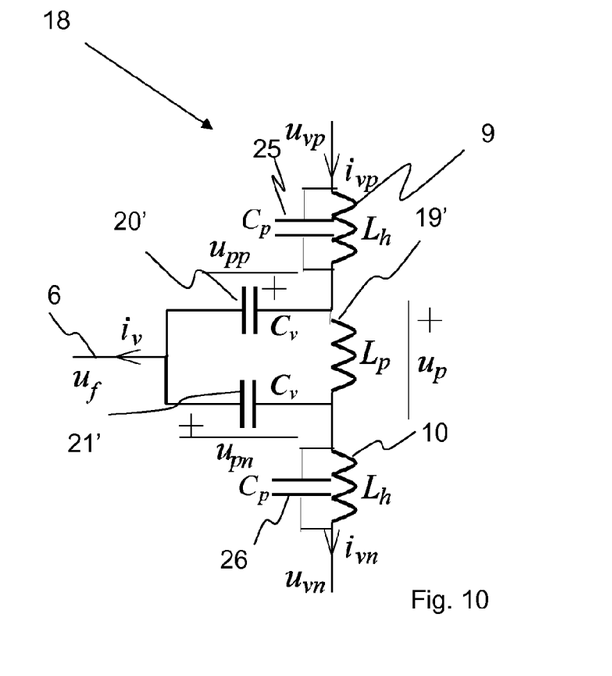
FIG. 10 shows an electronic filter according to a fourth embodiment of the invention.

Another variation providing the three functions is shown in FIG. 10. In FIG. 10 there is shown a filter according to a fourth embodiment of the invention. This filter includes the first and second energy storage elements 9, 10 of the first embodiment. They are thus of the same type and placed at the same position as in FIG. 5. However, the third, fourth and fifth energy storage elements 19', 20' and 21' are of the opposite type compared to the first embodiment. This means that the third energy storage element is inductive having an inductance $L_p$, while the fourth and fifth energy storage elements are capacitive having capacitances $C_v$. The further energy storage elements 25 and 26 are here capactive with capacitance $C_p$ and provided in parallel with the first and second energy storage elements 9 and 10. The filter here includes two parallel connections of the two types of elements, inductive and capacitive, through the first and second energy storage elements 9 and 10 being connected in parallel with a respective further element 25 and 26 of the opposite type. These parallel connections here provide the third harmonics filtering. The second harmonics filtering is again performed by the third, fourth and fifth energy storage elements. Here the fourth and fifth energy storage elements 20' and 21' also have the additional function of providing DC blocking. In this filter it is possible to determine the values of the third, fourth, fifth and additional energy storage elements using a similar differential and common mode analysis as described above in relation to the first embodiment. Then the capacitor values of the further energy storage elements 25 may be set according to $$C_p = \frac{1}{9\omega_1^2 L_h},$$

while the value of the fourth and fifth energy storage elements 20' and 21' may be set according to $$C_v = \frac{1}{2\omega_1^2 L_p}.$$

The selection of capacitor values $C_v$ and $C_p$ thus differs from in the first embodiment.

Figure 11:
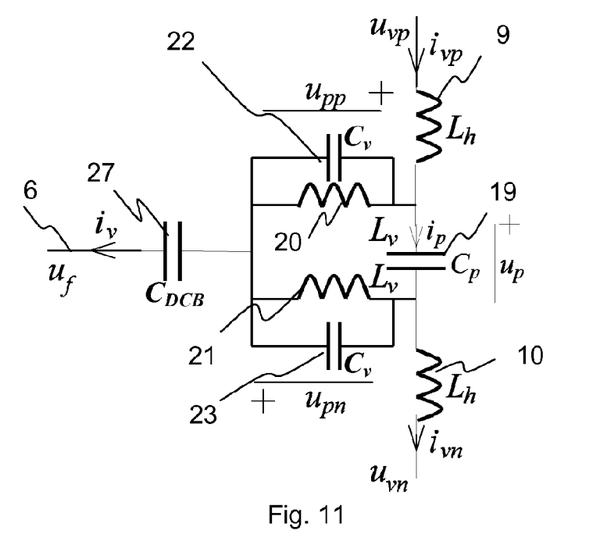
FIG. 11 shows an electronic filter according to a fifth embodiment of the invention

Another variation providing the three functions is shown in FIG. 11. In FIG. 11 there is shown a filter according to a fifth embodiment of the invention. This filter is based on the filter according to the first embodiment. This filter therefore includes the first, second, third, fourth, fifth, first further and second further energy storage elements 9, 10, 19, 20, 21, 22 and 23 of the first embodiment. The filter thus includes the same elements of the same types at the same positions as in FIG. 5. In addition to this the filter includes a sixth passive energy storage element 27 that is capacitive and at one end connected to both the second ends of the fourth and the fifth energy storage elements 20 and 21 and at a second end connected to the AC terminal 6. This sixth passive energy storage element 27 thus functions as the DC blocking element and has a capacitance $C_{DBC}$.

Figure 12:
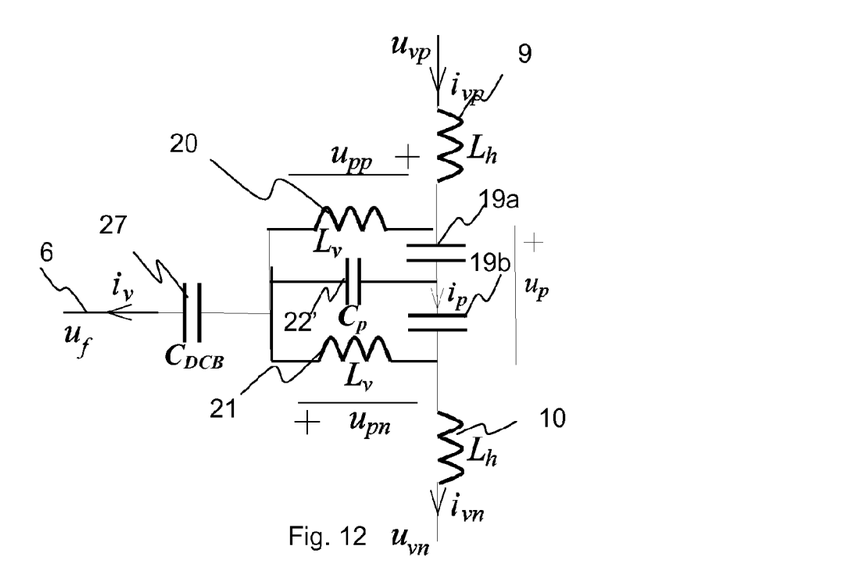
FIG. 12 shows an electronic filter according to a sixth embodiment of the invention.

Yet another variation according to a sixth embodiment of the invention is shown in FIG. 12. This variation is based on the second embodiment. It thus has the same elements of the same types and provided at the same positions as in FIG. 8. In addition to this it also has the same type of DC blocking element as in the fifth embodiment, i.e. a DC blocking element 27 placed at the same position in relation to the rest of the filter elements as in FIG. 11. Since the sixth embodiment is based on the second embodiment, the selection of capacitor values $C_v$ and $C_p$ will differ from in the first embodiment.

Figure 13:
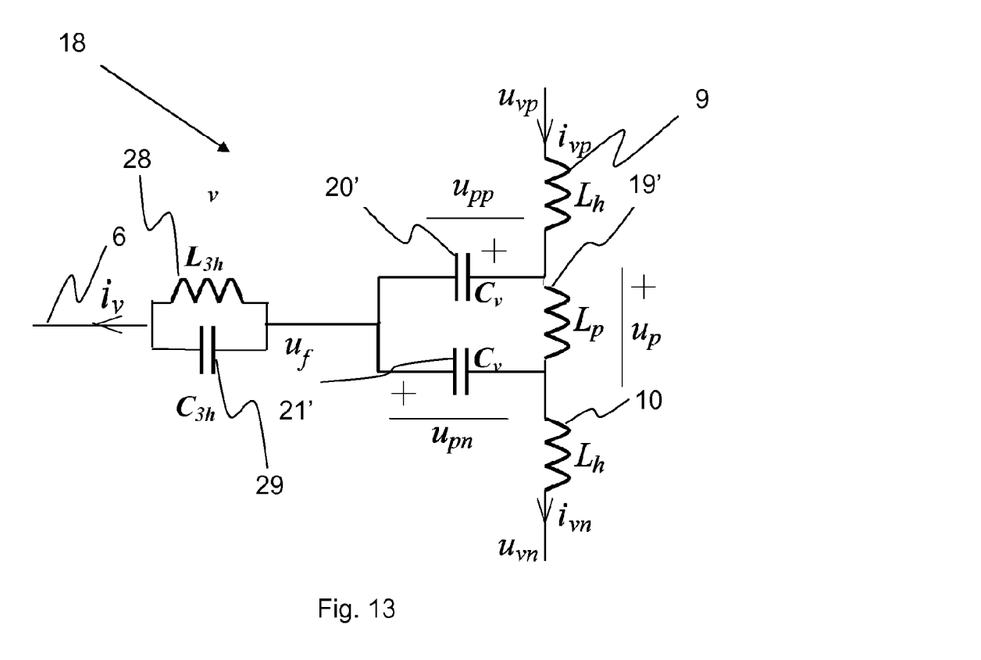
FIG. 13 shows an electronic filter according to a seventh embodiment of the invention.

Finally another variation according to a seventh embodiment of the invention is shown in FIG. 13. This filter is based on the filter according to the fourth embodiment. It includes the first, second, third, fourth and fifth energy storage elements 9, 10, 19', 20' and 21' in the same way as in the fourth embodiment. These filter elements are thus of the same types at the same positions as in FIG. 10, where the third, fourth sand fifth elements provide frequency component reduction at twice the fundamental frequency and the fourth and fifth elements also provide DC blocking. The filter here additionally includes only one parallel connection of the two types of elements, inductive and capacitive, in the paths between the DC terminals and the AC terminal, through providing an additional parallel connection of inductor 28 with inductance $L_{3h}$ and capacitor 29 with capacitance $C_{3h}$. This additional parallel connection is here provided in series between the AC terminal 6 and a junction between the parallel fourth and fifth energy storage elements 20' and 21'. The selection of capacitor values $C_v$ and $C_p$ will also here differ from in the first embodiment.

The invention has a number of advantages. It blocks circulating currents without having to resort to removing the current through the control of the voltage sources. This is combined with removal of zero sequence third harmonics. In this way no transformer is needed. Here some filter element may be involved in both types of filtering. There may thus be a dual use of a filter element. This reduces the amount of filter elements needed and also allows a size reduction of such a filter element compared with a filter only filtering at twice the fundamental frequency. This is in some embodiments combined with stopping a DC component from reaching the grid, which is also of advantage if there is no transformer between grid and voltage source converter. In some variations of the invention a filter element may combine DC blocking with a frequency filtering function, which provides even further savings. The use of two inductors in two paths for performing the same function also reduces the losses incurred by the inner resistances of the inductors. This is due to the fact that each path only takes half the grid current, while full grid current would pass through an inductor placed at the grid interface.

It should finally be mentioned that the element values $C_v$, $C_p$, $L_v$, $L_p$ etc. are in the figures used to indicate that there is a value associated with the element of the position. It is not intended to mean that the same type of element in the same position has the same value in the different embodiments. These values will normally differ from each other.

The invention claimed is:

1. A device for converting a DC voltage into an AC voltage and vice versa comprising at least one phase leg, each phase leg having a first voltage source and a first passive energy storage element connected in series between a first DC terminal and a first AC terminal and a second passive energy storage element and a second voltage source connected in series between the first AC terminal and a second DC terminal, where each of the voltage sources comprises at least a first and a second submodule in series-connection, each submodule comprising at least two power electronic switches connected in parallel with at least one capacitor, a passive electronic filter comprising passive energy storage elements is arranged between the first and second voltage sources as well as the first AC terminal, said filter comprising said first and second energy storage elements, a third energy storage element connected in series between the first and second energy storage elements, a fourth energy storage element having two ends, a first end connected to a junction between the first energy storage element and the third energy storage element and a second end coupled to the AC terminal and a fifth energy storage element having two ends, a first end connected to a junction between the second energy storage element and the third energy storage element and a second end coupled to the AC terminal, wherein the energy storage elements comprise elements of two different types, capacitive and inductive energy storage elements, with values selected to provide reduction of frequency components at three times the fundamental frequency of the AC voltage, wherein the energy storage elements comprise elements with values selected to provide reduction of frequency components at two times the fundamental frequency of the AC voltage, and at least one capacitive element of the filter is a DC blocking element for stopping DC components from reaching the AC terminal.

2. Device according to claim 1, wherein the third energy storage element is of one of the types and the fourth and fifth energy storage elements are of another type.

3. Device according to claim 1, wherein the energy storage elements providing filtering at three times the fundamental frequency include at least one parallel connection of the two types of elements, where each path between the DC terminals and the AC terminal includes such a parallel connection.

4. Device according to claim 3, where such parallel connections are provided through the first and second energy storage elements being connected in parallel with a respective further element of the opposite type in order to provide two parallel connections.

5. Device according to claim 3, where at least one of the elements of the filter is a combined filtering element assisting in filtering at both two times and three times the fundamental frequency of the AC voltage.

6. Device according to claim 5, wherein such parallel connections are provided through at least one further energy storage element of another type than the fourth and fifth energy storage elements is connected in a branch provided in parallel with the fourth energy storage element.

7. Device according to claim 6, wherein the further element is also connected in a branch being parallel with the fifth element and connected to the mid point of the third energy storage element.

8. Device according to claim 6, wherein there is provided a first further element in parallel with the fourth element and a second further element in parallel with the fifth element.

9. Device according to claim 3, wherein said parallel connection is provided through the parallel connection of one further element of the capacitive type with one further element of the inductive type being coupled in a common connection joining both the fourth and the fifth elements to the AC terminal.

10. Device according to claim 3, wherein the value of one energy storage element of such a parallel connection is inversely proportional to the value of the other energy storage element of the parallel connection, where the inverse of the value of said one storage element is equal to a fundamental frequency dependent constant times the value of the other energy storage element.

11. Device according to claim 10, wherein said constant includes the square of the fundamental frequency times a factor that is a multiple of 3.

12. Device according to claim 1, wherein the third, fourth and fifth energy storage elements are provided in a filter section providing filtering at two times the fundamental frequency of the AC voltage.

13. Device according to claim 12, wherein the value of the third energy storage element is inversely proportional to the value of the fourth and fifth energy storage elements, where the inverse of the value of the third energy storage element is equal to a fundamental frequency dependent constant times the value of the fourth and fifth energy storage elements.

14. Device according to claim 13, wherein said constant includes the square of the fundamental frequency times a factor that has a dependence of a multiple of 2.

15. Device according to claim 1, wherein at least one of the elements providing filtering at two times the fundamental frequency is adjustable.

16. Device according to claim 1, wherein at least one of the passive energy storage elements of the filter is a combined DC blocking and frequency filtering element at two times the fundamental frequency.

17. Device according to claim 16, wherein the fourth and the fifth energy storage elements are capacitive and function as DC blocking elements.

18. Device according to claim 1, wherein the first and the second energy storage elements are capacitive and function as DC blocking elements.

* * * * *